United States Patent
He et al.

(10) Patent No.: US 10,921,456 B2
(45) Date of Patent: Feb. 16, 2021

(54) METHOD AND SYSTEM OF REAL-TIME TRANSMISSION AND DEMODULATION OF BEIDOU SATELLITE NAVIGATION SIGNALS

(71) Applicant: Wuhan University, Wuhan (CN)

(72) Inventors: Zhibiao He, Wuhan (CN); Moyan Xiao, Wuhan (CN)

(73) Assignee: WUHAN UNIVERSITY, Wuhan (CN)

( * ) Notice: Subject to any disclaimer, the term of this patent is extended or adjusted under 35 U.S.C. 154(b) by 0 days.

(21) Appl. No.: 16/658,204

(22) Filed: Oct. 21, 2019

(65) Prior Publication Data
US 2020/0049829 A1 Feb. 13, 2020

Related U.S. Application Data

(63) Continuation-in-part of application No. PCT/CN2018/082729, filed on Apr. 12, 2018.

(30) Foreign Application Priority Data

Apr. 20, 2017 (CN) .......................... 2017 1 0261227
Oct. 27, 2017 (CN) .......................... 2017 1 1020413

(51) Int. Cl.
| | | |
|---|---|---|
| *G01S 19/02* | (2010.01) | |
| *G01S 19/24* | (2010.01) | |
| *H04B 1/69* | (2011.01) | |
| *H04B 7/185* | (2006.01) | |

(52) U.S. Cl.
CPC ............ *G01S 19/02* (2013.01); *G01S 19/243* (2013.01); *H04B 1/69* (2013.01); *H04B 7/18513* (2013.01)

(58) Field of Classification Search
CPC ................................ G01S 19/02; G01S 19/243
See application file for complete search history.

(56) References Cited

U.S. PATENT DOCUMENTS

2012/0001810 A1* 1/2012 Soualle .................. G01S 19/02
343/703
2013/0187809 A1* 7/2013 Rao ....................... G01S 19/243
342/357.25

OTHER PUBLICATIONS

BeiDou Navigation Satellite System Signal in Space Interface Control Document: Open Service Signal (Version 2.1), China Satellite Navigation Office, Nov. 2016 (Year: 2016).*

* cited by examiner

*Primary Examiner* — Bernarr E Gregory
*Assistant Examiner* — Fred H Mull
(74) *Attorney, Agent, or Firm* — Matthias Scholl P.C.; Matthias Scholl

(57) ABSTRACT

A method of real-time transmission and demodulation of BeiDou satellite navigation signals, the method including: constructing a large-scale parallel signal transmission branch, grouping a satellite navigation message in a large scale and sequentially sending the grouped messages into the parallel signal transmission branch, obtaining a navigation satellite parallel transmission branch-dedicated sub-ranging code by using a non-linear function driven complex shift pseudo-random code generator and perform spectrum-spreading for the navigation message of each branch, performing modulation by same carrier with different frequency offsets, then forming a composite satellite navigation signal by superimposing carrier-modulated navigation signals of all branches and adding a noise, and sending the composite satellite navigation signal by a single antenna.

16 Claims, 11 Drawing Sheets

| The navigation messages | | One way serial | The parallel branches | The parallel branches | The parallel branches |
|---|---|---|---|---|---|
| | Number | 1 | 16 | 256 | 1024 |
| D1 | Velocity(bps) | 50 | 50(/branch) | 50(/branch) | 50(/branch) |
| | Time(s) | 30 | 1.88 | 0.12 | 0.03 |

| The navigation messages | | One way serial | The parallel branches | The parallel branches | The parallel branches |
|---|---|---|---|---|---|
| | Number | 1 | 16 | 256 | 1024 |
| D1 | Velocity(bps) | 50 | 50(/branch) | 50(/branch) | 50(/branch) |
| | Time(s) | 30 | 1.88 | 0.12 | 0.03 |

FIG. 9

| The navigation messages | | One way serial | The parallel branches | The parallel branches | The parallel branches |
|---|---|---|---|---|---|
| | Number | 1 | 16 | 256 | 1024 |
| D1 | Velocity(bps) | 50 | 50(/branch) | 50(/branch) | 50(/branch) |
| | Time(min) | 12 | 0.75 | 0.05 | 0.01 |

FIG. 10

| The navigation messages(D1) | | One way serial | The parallel branches | The parallel branches | The parallel branches |
|---|---|---|---|---|---|
| | Number | 1 | 16(4×4) | 256(16×16) | 1024(32×32) |
| The ephemeris update | Time(s) (Time to first fix(s)) | 69.83 (74.83) | 13.99 (18.99) | 3.33 (8.33) | 1.27 (6.27) |
| The almanac update | Time(min) | 28.80 | 6.22 | 2.81 | 2.17 |

FIG. 11

METHOD AND SYSTEM OF REAL-TIME TRANSMISSION AND DEMODULATION OF BEIDOU SATELLITE NAVIGATION SIGNALS

CROSS-REFERENCE TO RELATED APPLICATIONS

This application is a continuation-in-part of International Patent Application No. PCT/CN2018/082729 with an international filing date of Apr. 12, 2018, designating the United States, now pending, and further claims foreign priority benefits to Chinese Patent Application No. 201710261227.5 filed Apr. 20, 2017, and to Chinese Patent Application No. 201711020413.6 filed Oct. 27, 2017. The contents of all of the aforementioned applications, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, Mass. 02142.

BACKGROUND

The disclosure relates to the field of satellite navigation, and more particularly to a method and system of real-time transmission and demodulation of BeiDou satellite navigation signals.

Four global major satellite navigation systems include Global Positioning System (GPS), Global Navigation Satellite System (GLONASS), Galileo Navigation Satellite System (GALILEO) and BeiDou Navigation Satellite System (BDS). The above satellite navigation systems realize navigation positioning by providing navigation messages for users.

The above satellite navigation systems adopt the 2nd-generation linear navigation signal single-channel serial transmission and demodulation technology put forward 40 years ago, and therefore, the user needs to take 3 seconds to 18.9 minutes to receive a satellite navigation signal. Such non-real-time navigation signal transmission and demodulation technology severely affects positioning performance of the user, resulting in the navigation positioning time from tens of seconds to tens of minutes. In addition, to fully utilize limited spectrum resources, the current satellite navigation system modulates and transmits different navigation signals by using a Binary Offset Carrier (BOC) and other different offset carriers. Due to the use of single-channel serial transmission, cross-correlation and correlation demodulations, multi-correlation peaks exist in the generation and receiving demodulation of the navigation signal and a process of separating offset carrier signals is complex. Thus, the transmission and demodulation time of the navigation signal cannot be reduced, and the navigation positioning performance is also low.

In addition, a solar-charged battery supplies power for the BeiDou navigation satellite, and the battery powers other loads of the system in addition to ensuring the transmission power of navigation signals at different frequency points. Therefore, by adopting the large-scale multi-antenna parallel signal transmission branch, it cannot be ensured that the navigation signals transmitted by different antennas have sufficient use power. In this case, high-speed transmission of the navigation signals cannot be realized and the rapid positioning requirement of the user is not satisfied.

SUMMARY

The disclosure provides a method of real-time transmission and demodulation of BeiDou satellite navigation signals, the method comprising:

S1: constructing small and medium-scale or large-scale or ultra-large-scale parallel signal transmission branches in a navigation satellite transmitter baseband chip FPGA to satisfy quasi-real-time or real-time transmission of subsequently grouped satellite navigation message, wherein the number of small and medium-scale parallel signal transmission branches is smaller than 100, the number of large-scale parallel signal transmission branches is not smaller than 100, and the number of ultra-large-scale parallel signal transmission branches is not smaller than 1000;

S2: generating the satellite navigation messages according to a given structure or constructing the satellite navigation messages with same or different navigation information combinations as a data block with a given length through injection of a ground injection station or in a navigation satellite transmitter DSP chip, and grouping the satellite navigation messages in a set length unit or regrouping fragmented satellite navigation messages or packing the grouped messages based on a group sequence number, time to live and message length and so on, to form the grouped messages into a matrix, wherein performing grouping based on the satellite navigation message structure comprises performing grouping based on a super-frame or a main frame or a sub-frame or a word or a data block, or a bit number with a set length;

S3: sequentially sending the grouped or group-coded satellite navigation messages in rows or columns or based on a given time slot, into the parallel signal transmission branches respectively;

S4: performing a hybrid operation with single state variables or multi-state variables or a function containing different parameters by taking a non-linear strength as a weight, and forming a real part by designing one group of non-linear functions with different diffusion coefficients as weights; performing a hybrid operation with another type of single state variable or multi-state variables or a function containing different parameters by taking a non-linear strength as a weight, and forming an imaginary part by designing another group of non-linear functions with different diffusion coefficients as weights; driving the interactions of the non-linear functions based on an action value obtained by performing a hybrid operation with tap values of the correlation register, and constructing a non-linear function driven complex shift pseudo-random code generator with an action value obtained by performing the hybrid operation with the non-linear function action values as a feedback end or constructing the linear shift pseudo-code generator with at least two linear shift registers, wherein the real part and the imaginary part of the correlation register state value of the non-linear function driven complex shift pseudo-random code generator form a real part sub-pseudo random code generator and an imaginary part sub-pseudo random code generator respectively;

S5: performing parameter setting for a series and a generated code length of the non-linear function driven complex shift pseudo-random code generator;

S6: initializing the state value of the non-linear function driven complex shift pseudo-random code generator with same or different complex data;

S7: outputting a pseudo-random number through one part of tap combinations of the real part and the imaginary part of the correlation register state value of the non-linear function driven complex shift pseudo-random code generator, obtaining a navigation satellite ranging code by a sorting method, binarization, and modulo-2 sum, and taking the code as the first or non-first parallel signal transmission branch-dedicated sub-ranging code, wherein the branch signal is used to detect existence of the navigation satellite navigation signal in an intercepted baseband satellite navigation signals;

S8: outputting a pseudo-random number through another part of tap combinations of the real part and the imaginary part of the correlation register state value of the non-linear function driven complex shift pseudo-random code generator, and obtaining public sub-ranging codes of all navigation satellite parallel signal transmission branches, which are referred to as navigation satellite public sub-ranging codes, by the sorting method, the binarizaiton and the modulo-2 sum, wherein a sum of the number of all navigation satellite ranging codes and the number of all navigation satellite public sub-ranging codes is not greater than the total number of tap combinations of the real parts and the imaginary parts of all correlation registers state values of the non-linear function driven complex shift pseudo-random code generator, and the navigation satellite public sub-ranging codes are mutually correlated or uncorrelated or orthogonal or non-orthogonal or orthogonal in one part and non-orthogonal in another part;

S9: obtaining remaining parallel signal transmission branch-dedicated sub-ranging codes of the navigation satellite which are referred to as navigation satellite-dedicated sub-ranging codes, by performing modulo-2 sum for the navigation satellite ranging codes and the navigation satellite public sub-ranging codes respectively, wherein these navigation satellite-dedicated sub-ranging codes have good cross correlation, and are stored in a file or a data buffer zone to satisfy a requirement of performing real-time spectrum spreading for the navigation message of each parallel signal transmission branch, and the navigation satellite ranging codes, navigation satellite public sub-ranging codes or the navigation satellite dedicated sub-ranging codes are synchronously driven by a same clock frequency-divided from a high precision and high stability atomic clock;

S10: generating navigation satellite-dedicated sub-ranging codes in real time or obtaining navigation satellite-dedicated sub-ranging codes through the file or the data buffer zone and performing spectrum spreading for the grouped navigation messages in the parallel signal transmission branch respectively, or performing spectrum spreading for the grouped navigation messages with different navigation satellite dedicate sub-ranging codes so as to form single-channel signals after superimposition and allow the signals to be transmitted in the same parallel signal transmission branch, wherein the navigation satellite-dedicated sub-ranging codes are obtained in one of the manners;

S11: modulating spread spectrum signals in the parallel signal transmission branches respectively by using same carriers or complex carriers with different frequency offsets or sub-carriers or complex sub-carriers with different orthogonal phases and different frequency offsets respectively, wherein one of the carriers is taken for modulation;

S12: performing power equalization by adjusting gain factors of navigation satellite-dedicated sub-ranging codes of different branches to reasonably allocate signal powers of different branches, and superimposing or combining carrier-modulated signals of all parallel signal transmission branches or with carrier signals of satellite navigation signals of other branches into single-channel signals, wherein less interference occurs between these carrier signals because the navigation satellite-dedicated sub-ranging codes of different parallel signal transmission branches are uncorrelated with each other;

S13: forming a baseband satellite navigation signal by adding Gaussian white noise or another noise to the superimposed or combined single-channel signal;

S14: transmitting the baseband satellite navigation signal by a single antenna in the form of multi-channel parallel superimposition after radiofrequency modulation and power amplification;

S15: receiving, by a user receiver, the baseband satellite navigation signal obtained by low-noise amplifier and radiofrequency transformation, through single-antenna single-channel or each sub-channel contained in the single-antenna single-channel or single-antenna multi-channel or each sub-channel contained in the single-antenna multi-channel, where a channel implementation manner is $m_r \times n_r$, wherein $m_r$ refers to the number of channels, $n_r$ refers to the number of sub-channels contained in each channel respectively, and each sub-channel sequentially performs real-time demodulation for the navigation signal of the parallel signal transmission branch in a sequence number range given by a satellite transmitter respectively, or multi-antenna single-channel or each sub-channel contained in the multi-antenna single-channel or multi-antenna multi-channel or each sub-channel contained in the multi-antenna multi-channel, wherein the single-antenna single-channel or each sub-channel contained in the single-antenna single-channel refers to that each antenna is only connected to one signal processing channel, and the channel or each sub-channel contained in the channel is in charge of receiving all satellite navigation signals; the single-antenna multi-channel or each sub-channel contained in the single-antenna multi-channel refers to that each antenna is connected to not less than two signal processing channels, and each channel or each sub-channel contained in the channel is in charge of receiving corresponding satellite navigation signals; the multi-antenna single-channel or each sub-channel contained in the multi-antenna single-channel refers to that each antenna is connected to one signal processing channel respectively; the multi-antenna multi-channel or each sub-channel contained in the multi-antenna multi-channel refers to that each antenna is connected to not less than two signal processing channels respectively, and each channel or each sub-channel contained in the channel is in charge of receiving the corresponding satellite navigation signals, the channel and the sub-channels contained in the channel are implemented in the user receiver baseband chip; the number of the signal processing channels or different sub-channels contained in the channel is sufficient to ensure the real-time demodulation of the received satellite navigation signals; since each channel demodulates the navigation signals of not less than one navigation satellite respectively in the same manner, a process of performing real time demodulation for the navigation signals of one navigation satellite with $n_r$ sub-channels of one channel will be described below;

S16: selecting a sub-channel number $i_r$ as ($1 \le i_r \le n_r$) and a sequence number $i_t$ of a parallel signal transmission branch of the satellite transmitter corresponding to the sub-channel being equal to a starting sequence number of the parallel signal transmission branch of the transmitter corresponding to the sub-channel of the channel;

S17: intercepting or intercepting, in a given time slot, a segment of the baseband satellite navigation signal;

S18: generating a local carrier or a complex carrier;

S19: obtaining a carrier-removed signal by performing carrier removal for the navigation signal obtained in S17 by a Doppler frequency shift carrier matching method;

S20: generating a navigation satellite-dedicated sub-ranging code of the parallel signal transmission branch in real time or obtaining the navigation satellite-dedicated sub-ranging code of the parallel signal transmission branch through the file or the data buffer zone, and firstly eliminating cross interface of the dedicated sub-ranging codes by using a multi-user detection technology, and then binarizing the carrier-removed signal by the sorting method to perform relevant processing by an FFT-based cyclic correlation method; wherein, when $i_r=1$ and a correlation peak exists, it indicates that the navigation satellite signal exists in the received signals, the navigation message is demodulated with the carrier-removed signal of the baseband satellite navigation signals received from the branch according to the position of correlation peak; when $i_r>1$ and the correlation peak exists, the navigation message is demodulated from the carrier-removed signal of the baseband satellite navigation signals received by the branch according to the position of the correlation peak, and S21 is performed; otherwise, S17 is performed;

S21: $i_t=i_t+1$, when $i_t$ is smaller than or equal to a cut-off sequence number of the parallel signal transmission branch of the satellite transmitter corresponding to the sub-channel of the channel, performing S17; otherwise, performing S22;

S22: changing the grouped navigation messages or unpacked grouped navigation messages obtained from the parallel signal transmission branches of different sub-channels from parallel transmission to serial transmission and obtaining complete navigation messages of one navigation satellite through the channel;

S23: obtaining visual navigation messages of navigation satellites through different channels respectively according to blocks S15-S22, and performing positioning solution for the navigation messages of four selected navigation satellites by using a microprocessor containing no less than one core to realize rapid navigation positioning; and S24: ending the process.

In S7, the pseudo-random number tap-output by the real part and the imaginary part of the register state value is binarized; since the processing of changing the pseudo-random number is changed into the pseudo-random code by a statistic analysis method is simple, when the tap-output pseudo-random code sequence is different from other tap-output pseudo-random code sequences in one part of values, and the other part of values are same or all values are same, processing is performed in the following manner: performing inversion for all values of the pseudo-random code sequence; or performing cyclic shifting for the pseudo-random code sequence with a set code length; or mixing the pseudo-random code sequence with another pseudo-random code sequence; or deleting one of the pseudo-random code sequences.

In S8, the navigation satellite public sub-ranging codes are generated by combining another part of taps of the variables or the functions or the register state values of different sub-pseudo-random code generators of the pseudo-random code generator that generates navigation satellite ranging codes and is formed by different sub-pseudo-random code generators, or by combining joint taps of the variables or the functions or the register state values of another pseudo-random code generator, or by combining individual taps of the variables or the functions or the register state values of different sub-pseudo-random code generators of another pseudo-random code generator formed by different sub-pseudo-random code generators; or real numbers output by these taps are modulated by real number offset carriers respectively and pseudo-randomness of sub-sequently generated pseudo-random codes maintained by adjusting relevant parameters of the non-linear functions constructing the pseudo-random code generator, or under a condition that the taps of the variables or the functions or given state values of the register structure of the pseudo-random code generator are unchanged, different navigation satellite ranging codes or navigation satellite public sub-ranging codes or navigation satellite-dedicated sub-ranging codes with different navigation frequency points satisfying different navigation service requirements are generated in a unified manner by changing initial values or changing the relevant parameters of the non-linear functions constructing the pseudo-random code generator or re-designing the non-linear functions constructing the pseudo-random code generator, wherein one part of tap combinations of all tap combinations of the variables or functions or register state values of different sub-pseudo-random code generators of the pseudo-random code generator are used to perform phase allocation for the navigation satellite ranging codes, another part of tap combinations are used to perform phase allocation for the navigation satellite public sub-ranging codes or navigation satellite-dedicated sub-ranging codes, and the remaining tap combinations are used as backup for future extensions.

In S7 and S8, binarization is performed by a sorting method. That is, the pseudo-random numbers are sorted in an ascending or descending order, a middle value thereof is taken as a threshold. The pseudo-random numbers greater than or equal to the threshold are valued as 1, and the pseudo-random numbers smaller than the threshold are valued as 0.

In S9, the navigation satellite ranging code is individually used as the dedicated sub-ranging code of one parallel signal transmission branch, or used as the dedicated sub-ranging code of one parallel signal transmission branch after being subjected to modulo-2 sum or mixed with the public sub-ranging codes of one navigation satellite; or the navigation satellite-dedicated sub-ranging codes are modulated by a binary offset carrier respectively and the pseudo-randomness of the dedicated sub-ranging code is maintained by adjusting relevant parameters of the non-linear functions constructing the pseudo-random code generator.

In S10, different parallel signal transmission branches transmit same or different types of non-multiplexed or multiplexed satellite pilot signals or satellite navigation signals or satellite communication signals at the same time.

In S11, the Doppler frequency shift is in a range of (−10 kHz, 10 kHz).

In S13, the signal-to-noise ratio of the satellite navigation signal is in a range of (−15 dB, 0 dB).

In S14, the carrier signals of the parallel signal transmission branch are divided into different parts or superimposed or combined with carrier signals of satellite navigation signals of other branches for multi-antenna transmission performed through at least two antennas after radiofrequency modulation and power amplification, or spread spectrum signals of parallel signal transmission branches are superimposed or combined with partial or all spread spectrum signals of satellite navigation signals of other branches and modulated by same carriers or sub-carriers with different orthogonal phases for multi-antenna transmission performed through the single antenna or at least two antennas after radiofrequency modulation and power amplification.

In S15, the non-multiplexed or multiplexed satellite pilot signal or the satellite navigation signal or the satellite communication signal or a satellite control signal is received or sent between the navigation satellite and a ground receiver or between the navigation satellite and a ground station or between the navigation satellites or between a ground based augmentation system and both the navigation satellite and the ground receiver through the single-antenna single-channel or each sub-channel contained in the single-antenna single-channel or the single-antenna multi-channel or each sub-channel contained in the single-antenna multi-channel or the multi-antenna single-channel or each sub-channel contained in the multi-antenna single-channel or the multi-antenna multi-channel or each sub-channel contained in the multi-antenna multi-channel, wherein each channel containing sub-channels contains same or different numbers of sub-channels respectively; the above single channel or multi-channel processes not only relevant transmitter parallel signals received but also serial signals; if baseband signals generated by the channel are transmitted, the processed baseband signals are transmitted through a corresponding antenna after radiofrequency modulation and power amplification; if signals are received through an antenna, the signals are sent into relevant channel through low-noise amplifier and radiofrequency transformation.

A system for realizing real-time transmission and demodulation technology of a BeiDou satellite navigation signal comprises:
- a large-scale parallel signal transmission branch constructing module, configured to satisfy a requirement that navigation messages are grouped in a large scale to realize real-time transmission of navigation signals;
- a navigation message grouping serial-to-parallel module, configured to group the satellite navigation messages in a set length unit or regroup fragmented satellite navigation messages after recombination so that the transmission is changed from serial transmission to parallel transmission so as to improve transmission efficiency of the navigation messages;
- a non-linear function driven complex shift pseudo-random code generator constructing module, configured to perform a hybrid operation with one type of single-state variable or multi-state variable or a function containing different parameters by taking a nonlinear strength as weight and form a real part by designing one group of non-linear functions with different diffusion coefficients as weights, and then perform a hybrid operation with another type of single-state variable or multi-state variable or a function containing different parameters by taking a nonlinear strength as weight and form an imaginary part by designing another group of non-linear functions with different diffusion coefficients as weights, drive interactions of the non-linear functions by using an action value obtained by performing a hybrid operation with a correlation register tap value, and take the action value obtained by performing the hybrid operation according to the action value of the non-linear function as a feedback end to construct a non-linear function driven complex shift pseudo-random code generator or constructing the linear shift pseudo-code generator with at least two linear shift registers;
- a sub-ranging code generating module, configured to: output a pseudo-random number by using one part of tap combinations of the real part and the imaginary part of correlation register state value of the non-linear function driven complex shift pseudo-random code generator to obtain a navigation satellite ranging code by the sorting method, binarization and modulo-2 sum; output a pseudo-random number by using another part of tap combinations of the real part and the imaginary part of the correlation register state value to obtain a navigation satellite public sub-ranging code by the sorting method, binarization and modulo-2 sum; and finally obtain a navigation satellite-dedicated sub-ranging code by performing modulo-2 sum for the navigation satellite public sub-ranging code and the navigation satellite ranging code respectively;
- a spectrum-spreading module, configured to perform spectrum spreading for the grouped navigation messages in the parallel signal transmission branch or within the given time slot respectively by using the navigation satellite dedicated sub-ranging code;
- a carrier modulating module, configured to modulate spread spectrum signals in the parallel signal transmission branches by using carriers or complex carriers with different frequency offsets or sub-carriers or complex sub-carriers with different orthogonal phases respectively;
- a signal superimposing module, configured to superimpose or combine spread spectrum signals or carrier modulated signals of all or partial parallel signal transmission branches or together with spread spectrum signals or carrier modulated signals of other parallel signal transmission branches;
- a navigation signal generating module, configured to generate a baseband satellite navigation signal by adding Gaussian white noise or another noise to the superimposed or combined signal;
- a tracking and capturing module, configured to perform carrier-removal, de-spreading and demodulation for the navigation signals of different parallel signal transmission branches of a navigation satellite transmitter respectively;
- a navigation message parallel-to-serial changing module, configured to change the grouped navigation messages obtained by performing carrier-removal, de-spreading and demodulation for different parallel signal transmission branches from parallel transmission or unpacked grouped navigation messages to serial transmission to obtain complete navigation message of the satellite; and
- a positioning solution module, configured to realize rapid navigation positioning according to the obtained satellite navigation message.

The tracking and capturing module is operated as follows:
1) receiving, by the receiver, the baseband satellite navigation signal through single-antenna multi-channel or each sub-channel contained in the single-antenna multi-channel;
2) taking a sub-channel number $i_r$ as ($1 \le i_r \le n_r$) and a sequence number it of a parallel signal transmission branch of the satellite transmitter corresponding to the sub-channel being equal to a starting sequence number of the parallel signal transmission branch of the satellite transmitter corresponding to the sub-channel of the channel;
3) intercepting, or intercepting in a given time slot, a segment of the baseband satellite navigation signal;
4) generating a local carrier or a complex carrier;
5) obtaining a carrier-removed signal by performing carrier removal for the navigation signal obtained in 3) by the Doppler frequency shift carrier matching method;
6) generating a parallel signal transmission branch navigation satellite-dedicated sub-ranging code in real time or obtaining the parallel signal transmission branch navigation satellite dedicated sub-ranging code through a file or a data buffer zone, firstly eliminating cross interface of the dedicated sub-ranging codes by using a multi-user detection technology, and then binarizing the carrier-removed signal by the sorting method to perform relevant processing by an FFT-based cyclic correlation method; wherein when $i_r=1$ and a correlation peak exists, it indicates that the navigation satellite signal exists in the received signals, the navigation message is demodulated with the carrier-removed signal of the baseband satellite navigation signals received from the branch according to the position of correlation peak; when $i_r>1$ and the correlation peak exists, the navigation message is demodulated from the carrier-removed signal of the baseband satellite navigation signals received by the branch according to the position of the correlation peak, and 7) is performed; otherwise, 3) is performed;
7) $i_r=i_r+1$, when it is smaller than or equal to a cut-off sequence number of the parallel signal transmission branch of the satellite transmitter corresponding to the sub-channel of the channel, performing 3); otherwise, performing 8); and
8) changing the grouped navigation messages obtained from parallel signal transmission branches of each sub-channel or unpacked grouped navigation messages from parallel transmission to serial transmission and obtaining a complete navigation message of one navigation satellite through the channel.

Compared to the current technology, the method and system have the following advantage and beneficial effect.

(1) All navigation satellites share the same pseudo-random code generators.

All navigation satellites obtain public sub-ranging codes by using the pseudo-random code generators generating the navigation satellite ranging codes, greatly reducing the number of the pseudo-random code generators generating the sub-ranging codes and fully lowering hardware costs.

(2) Ranging codes of different frequency points are generated by a unified method.

In a case that the structure and the tap of the correlation register of the pseudo-random code generator are unchanged, different navigation satellite ranging codes with different navigation frequency points satisfying different navigation service requirements are generated by changing correlation values through the unified method.

(3) The navigation satellite transmits multi-branch navigation signals by the single antenna.

Different parallel signal transmission branches of the navigation satellite transmitter use well-uncorrelated dedicated sub-ranging codes carrying the ranging code information of the navigation satellite, different branch navigation messages are superimposed into single-channel signals after spectrum spread and modulation, and then transmitted by the single antenna, greatly reducing the number of transmitting antennas at the satellite end.

(4) The satellite navigation signal can be transmitted and demodulated in real time.

The satellite navigation signal can be transmitted and demodulated in real time since the large-scale parallel signal transmission and demodulation technology is adopted for the satellite navigation signal.

(5) The technical problem of multi-correlation peaks existing in the demodulation of the offset-carrier-modulated navigation signal is solved.

The pseudo-randomness of the off-carrier modulated spread spectrum signal is maintained by adjusting the relevant parameters of the non-linear function for constructing the pseudo-random code generator, and thus, the problem of multi-correlation peaks arising from the offset carrier modulation is eliminated by the relevant demodulation, and the navigation signal demodulation time is shortened.

(6) Rapid satellite navigation positioning can be performed.

The rapid satellite navigation positioning can be realized by performing positioning solution for the obtained satellite navigation message through real-time transmission and demodulation of the satellite navigation signal.

BRIEF DESCRIPTION OF THE DRAWINGS

FIG. 9 illustrates the main frame transmission time of D1 navigation message under a condition of the transmitter is single-channel serial and parallel-channel serial of the number of branches is 16,256 and 1024 respectively according to one embodiment of the disclosure.

FIG. 10 illustrates the super frame transmission time of D1 navigation message under a condition of the transmitter is single-channel serial and parallel-channel serial of the number of branches is 16,256 and 1024 respectively according to one embodiment of the disclosure.

FIG. 11 illustrates D1 navigation message satellite ephemeris, ephemeris update and first navigation and positioning time under a condition of the transmitter is single-channel serial and parallel-channel serial of the number of branches is 16,256 and 1024 respectively, and the number of sub-channels of user receiving terminal and the number of sub-channels of navigation signal processing in each sub-channel are 4, 16 and 32 respectively according to one embodiment of the disclosure.

DETAILED DESCRIPTION OF THE EMBODIMENTS

Figure 1A:
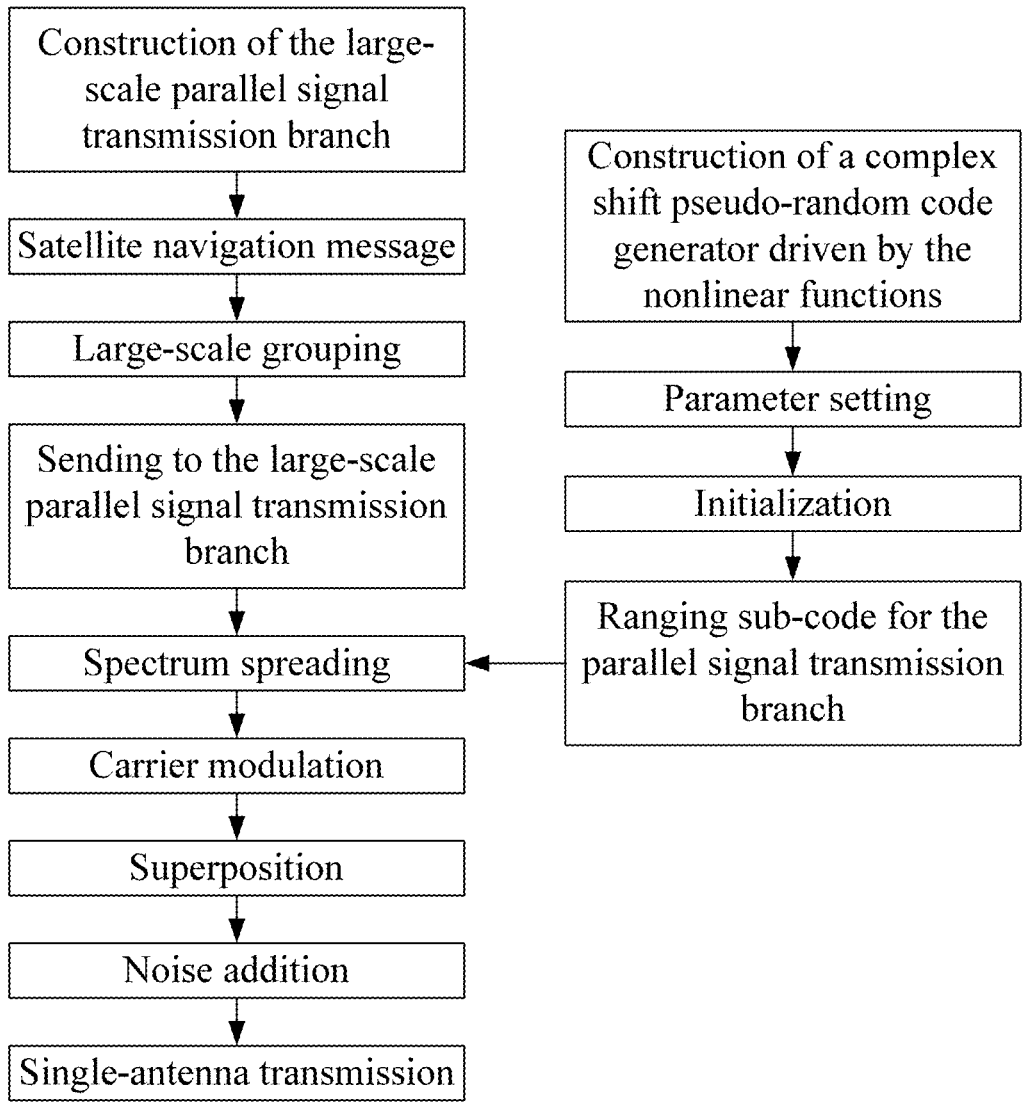
FIG. 1A is a flowchart of transmission of a navigation signal according to one embodiment of the disclosure.
Figure 1B:
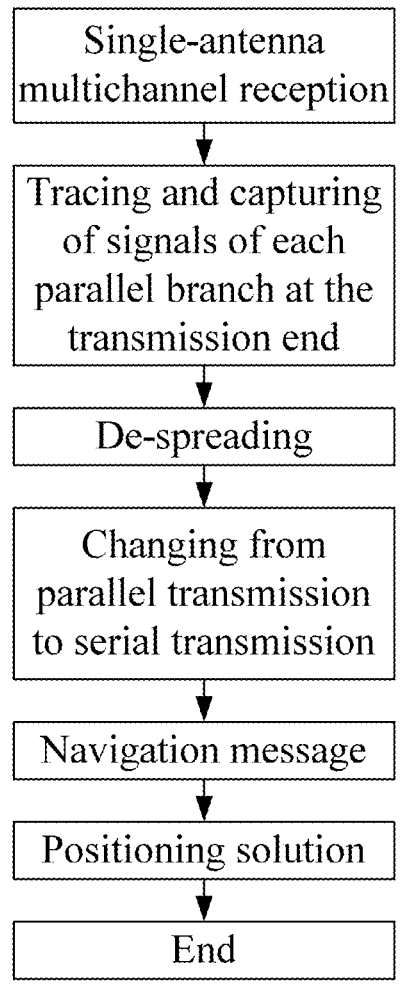
FIG. 1B is a flowchart of receiving and demodulation of a navigation signal according to one embodiment of the disclosure.

In an example, a navigation satellite transmitter implemented as a large-scale parallel signal transmission branch system is described through the following blocks according to FIG. 1.

In S1, a total number of satellite parallel signal transmission branches is selected as $m_t$=256.

In S2, a binary satellite navigation message with a length of 1536 bits is generated and then divided into 256 groups with each group being 6 bits to form a 256×6 matrix.

In S3, the grouped satellite navigation messages are sequentially sent into 1st-256th parallel signal transmission branches in rows respectively.

In S4, a hybrid operation is performed with three x state variables x1, x2 and x3 and a sin function containing different parameters, and a real part is formed by designing one group of non-linear functions with different diffusion coefficients as weights; by a hybrid operation is performed with three y state variables y1, y2 and y3 and a cos function containing different parameters, and an imaginary part is formed by designing another group of non-linear functions with different diffusion coefficients as weights. The interactions of the non-linear functions are driven by performing a hybrid operation with the correlation register tap values. A non-linear function driven complex right shift pseudo-random code generator is constructed with the hybrid operation action values of these non-linear function action values as a feedback end.

In S5, a series of the non-linear function driven complex right shift pseudo-random code generator is selected as 5 with a length of a generated code being 128 bits, where the total number of tap combinations of the real part and the imaginary part of the register state value of the non-linear function driven complex right shift pseudo-random code generator is not less than 600. A part of the remaining taps no more than 600 are used to generate public sub-ranging codes of all navigation satellites except for 35 taps reserved for 35 BeiDou satellites to generate navigation satellite ranging codes.

In S6, the state value of the non-linear function driven complex right shift pseudo-random code generator is initialized with 0.1+0.1j.

Figure 2:
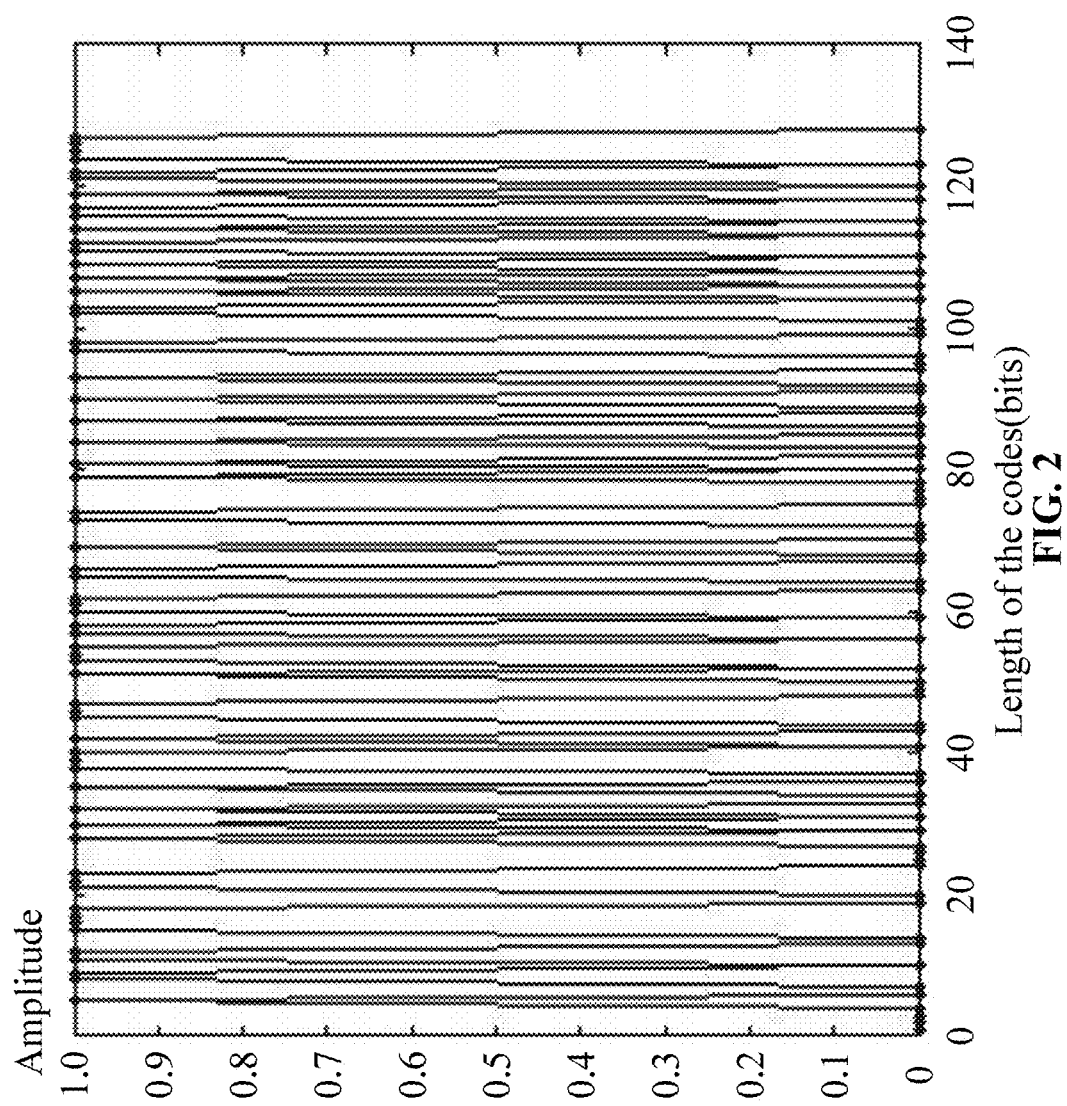
FIG. 2 illustrates a 1st branch-dedicated sub-ranging code according to one embodiment of the disclosure.

In S7, a pseudo-random number of 150 seconds is output by combining any tap of the real part of each register state value of the non-linear function driven complex right shift pseudo-random code generator with any three taps of the imaginary part of each register state value, a pseudo-random number of 128 seconds is intercepted by delaying 5 seconds respectively, binarization and modulo-2 sum are performed for the pseudo-random number by a sorting method respectively to obtain a BeiDou navigation satellite ranging code of 128 bits and take the ranging code as a BeiDou navigation satellite-dedicated sub-ranging code of the 1st parallel signal transmission branch, as shown in FIG. 2.

In S8, a pseudo-random number of 150 seconds is output by combining any three taps and any four taps of the real part of each register state value of the non-linear function driven complex right shift pseudo-random code generator with one to five taps of the imaginary part of each register state value, the pseudo-random number of 128 seconds is intercepted by delaying 5 seconds respectively, and the 2nd-256th navigation satellite public sub-ranging codes of 128 bits of the BeiDou navigation satellite are obtained by binarizing the pseudo-random numbers by the sorting method respectively.

Figure 3:
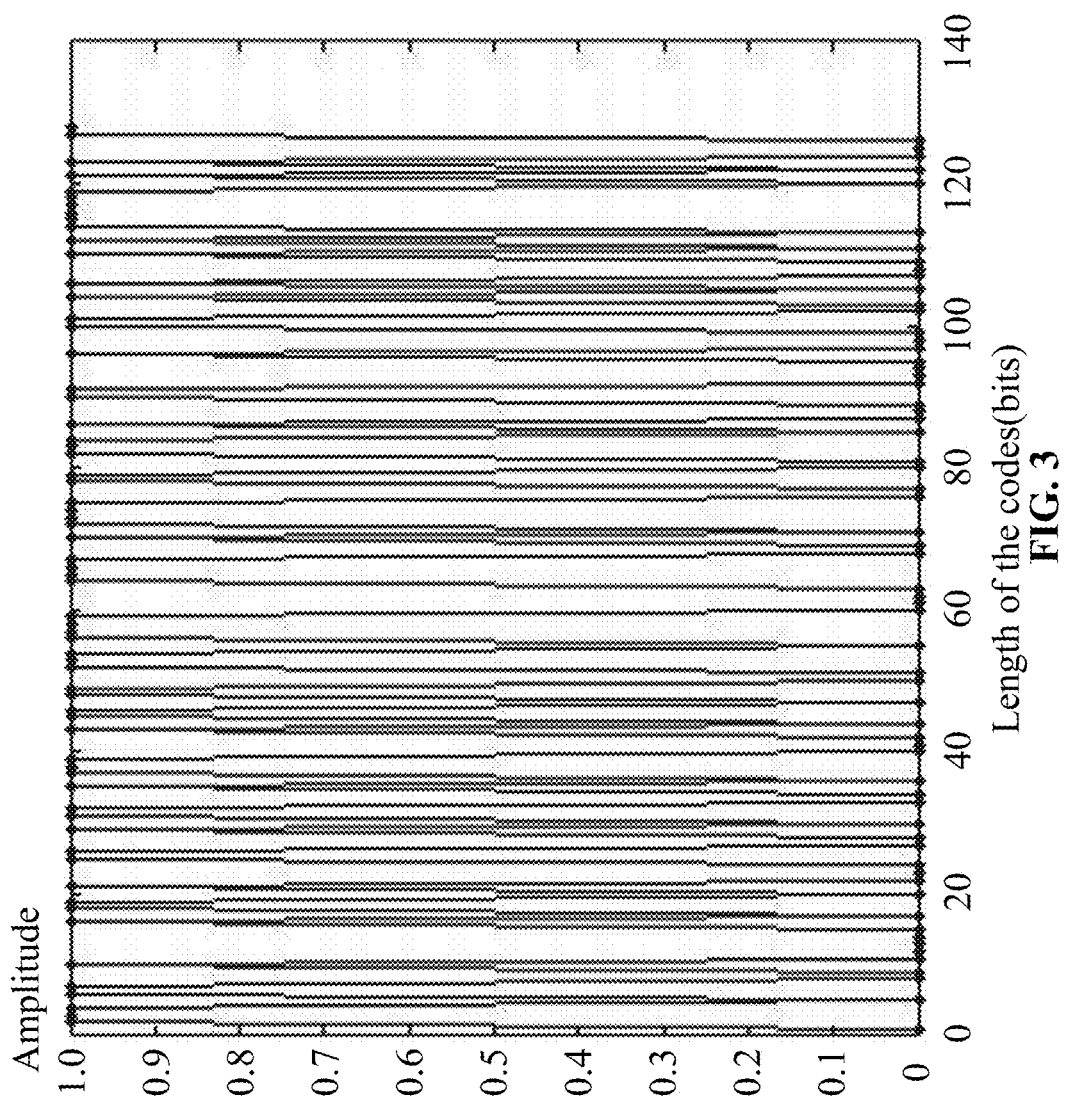
FIG. 3 illustrates a 110th branch-dedicated sub-ranging code according to one embodiment of the disclosure.

In S9, the navigation satellite-dedicated sub-ranging codes of 128 bits of the 2nd-256th parallel signal transmission branches of the BeiDou navigation satellite are obtained by performing modulo-2 sum for the BeiDou navigation satellite ranging codes and the 2nd-256th navigation satellite public sub-ranging codes, and then stored in a data buffer zone, as shown in FIG. 3.

Figure 4:
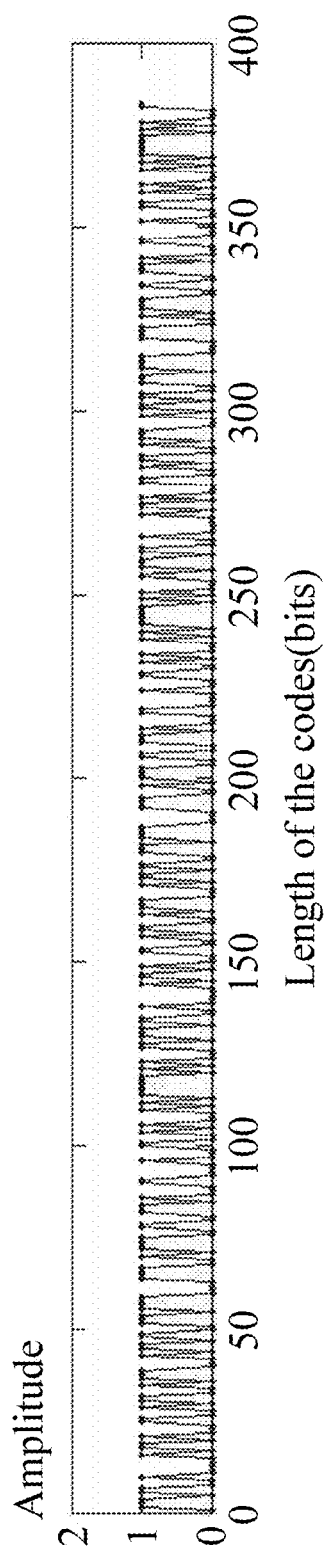
FIG. 4 illustrates a spread spectrum signal of a 110th branch according to one embodiment of the disclosure.

In S10, spectrum spreading is performed for each bit of the grouped navigation message in the 1st-256th parallel signal transmission branches respectively with three BeiDou navigation satellite-dedicated sub-ranging codes of each branch as one group, as shown in FIG. 4.

In S11, spread spectrum signals in the parallel signal transmission branches are modulated respectively by using a complex carrier with a particular frequency offset.

In S12, because a desktop computer takes an extremely long period of time to perform simulation processing for 256 channels of signals, a total of 16 branches i.e. from the 100th to 115th channels of the 256 channels, are selected for superimposing the navigation signals into single-channel signals.

Figure 5:
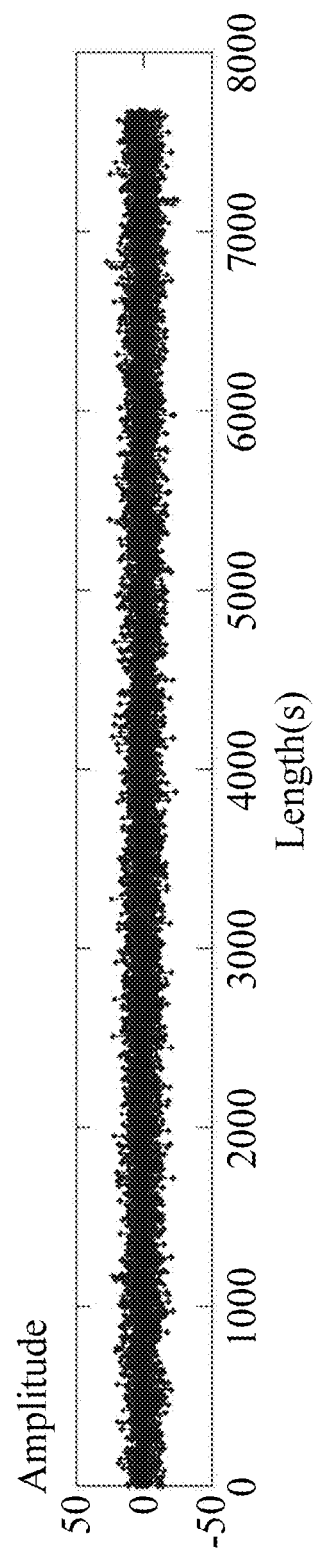
FIG. 5 illustrates carrier signal superimposition and noise addition of 110-115th parallel signal transmission branches according to one embodiment of the disclosure.

In S13, a BeiDou navigation satellite baseband transmission signal is formed by adding Gaussian white noise of −10 dB to the superimposed single-channel signal, as shown in FIG. 5.

In S14, the BeiDou navigation satellite baseband transmission signal is transmitted by a single antenna.

In S15, a receiver receives the BeiDou navigation satellite baseband transmission signal through a sub-channel ($m_r$=16, $n_r$=16) contained in a single-antenna multi-channel, where each sub-channel performs real-time demodulation for the navigation signal of the parallel signal transmission branch with the sequence number as $$\left((\text{sub-channel sequence number}-1) \times \frac{m_t}{n_r} + 1 \sim \frac{m_t}{n_r} \times \text{sub-channel sequence number}\right)$$

in the BeiDou satellite transmitter. Since each channel demodulates the navigation signal in the same process, each channel is required to demodulate the navigation signals of at least two BeiDou satellites. A process of demodulating the navigation signal of one BeiDou satellite in real time through the 1st channel and its 16 sub-channels will be described below.

In S16, a sub-channel sequence number is selected as $i_r$ ($1 \leq i_r \leq 16$) and a starting sequence number of the parallel transmission branch of the BeiDou satellite transmitter corresponding to the sub-channel is $i_t=(i_r-1) \times 16 + 1$.

In S17, a segment of baseband satellite navigation signal is intercepted.

In S18, a local carrier or a complex carrier is generated.

Figure 6:
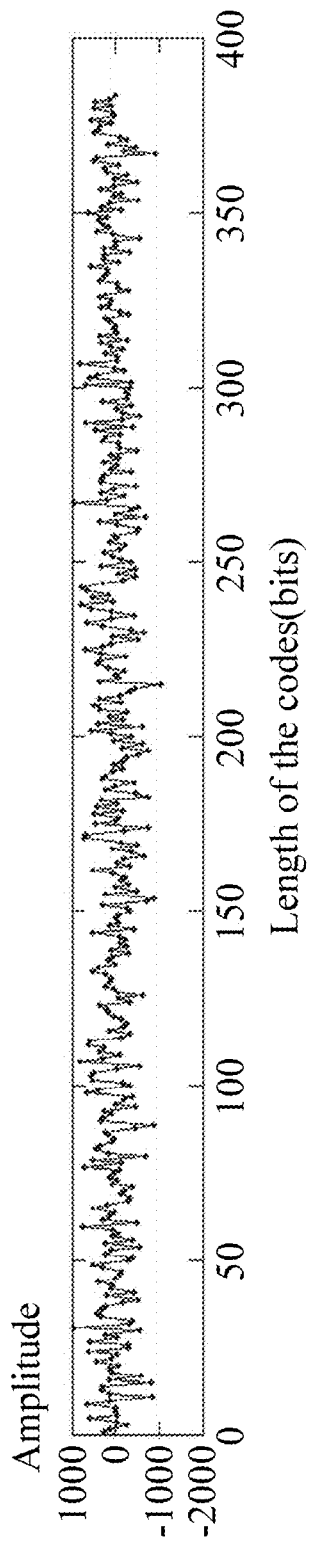
FIG. 6 illustrates a carrier-removed signal of a 7th sub-channel of a 1st channel according to one embodiment of the disclosure.

In S19, a carrier-removed signal is obtained by performing carrier removal for the navigation signal obtained in S17 by the Doppler frequency shift carrier matching method, as shown in FIG. 6.

Figure 7:
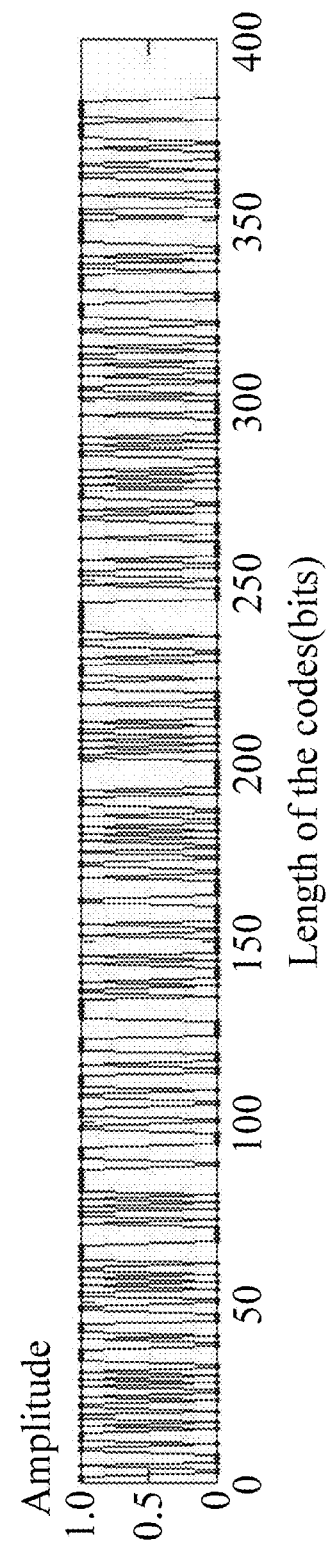
FIG. 7 illustrates a carrier-removed binarized signal of FIG. 6 according to one embodiment of the disclosure.
Figure 8:
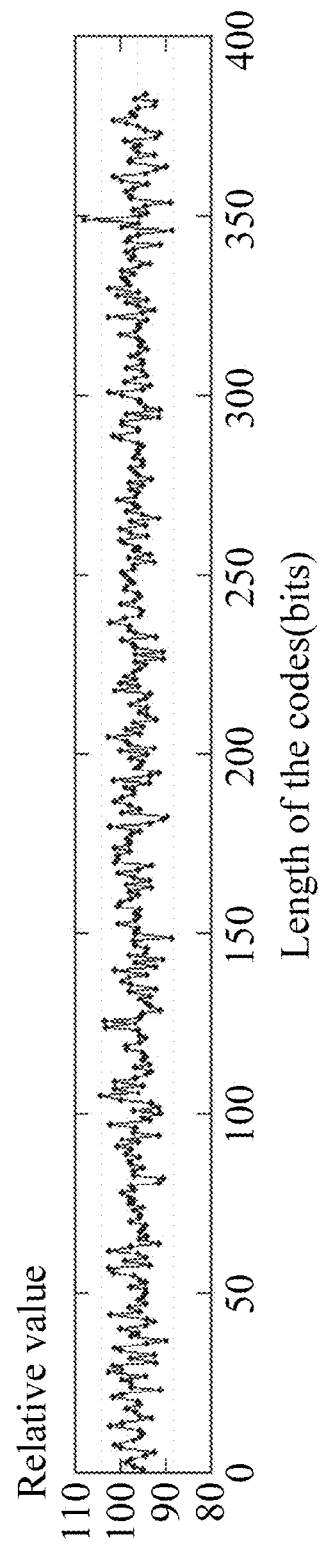
FIG. 8 illustrates a tracked and captured signal of a navigation signal under a condition of a signal-to-noise ratio being −10 dB, a frequency shift being 16 Hz and a code shift being 349 bits according to one embodiment of the disclosure.
Figure 12:
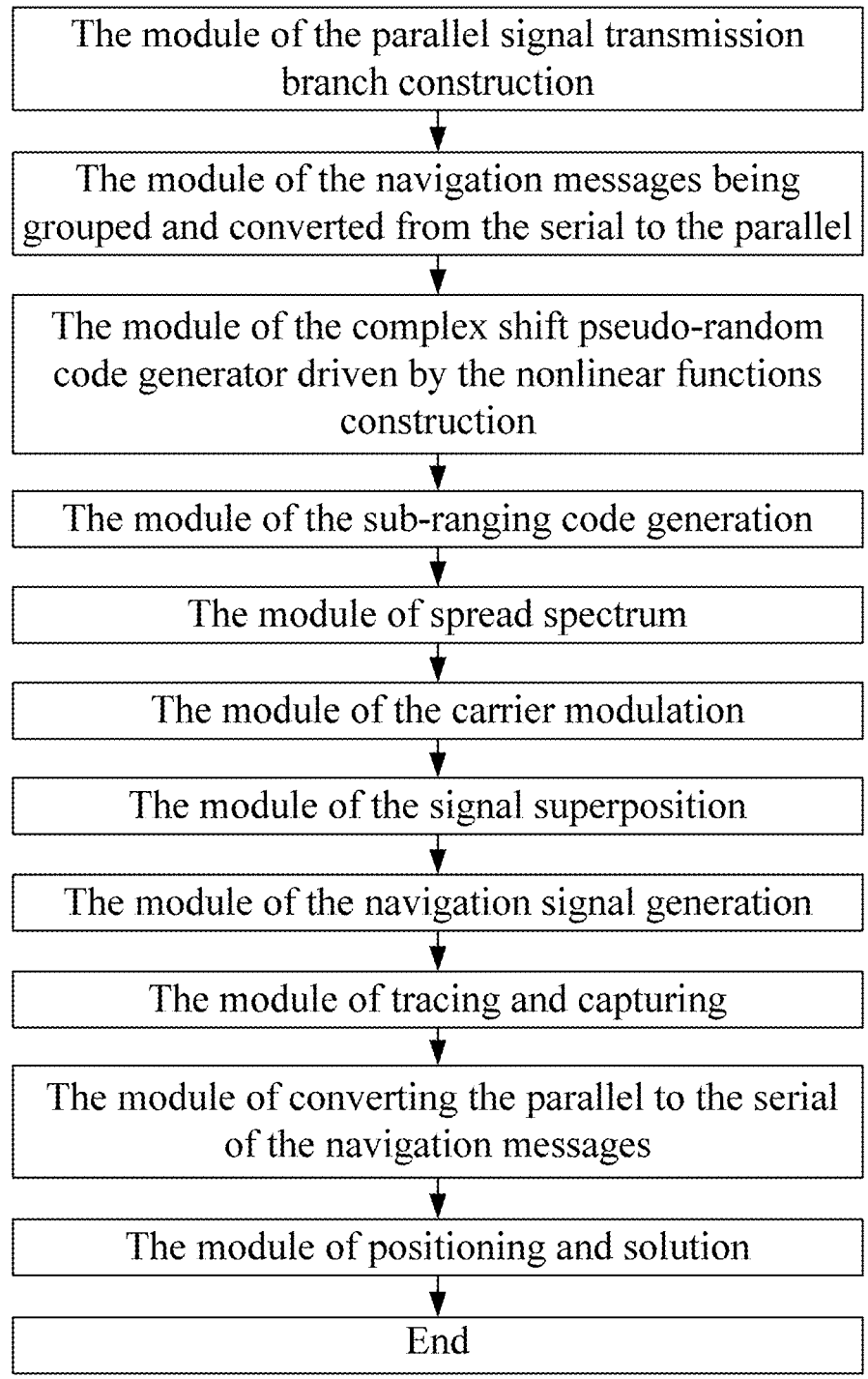
FIG. 12 shows modules of a real-time transmission and demodulation of BeiDou satellite navigation signals according to one embodiment of the disclosure.

In S20, the BeiDou navigation satellite-dedicated sub-ranging code of the parallel signal transmission branch is obtained through a data buffer zone and the carrier-removed signal is binarized by the sorting method (shown in FIG. 7) to perform relevant processing by an FFT-based cyclic correlation method; if $i_r=1$ and a correlation peak exists (shown in FIG. 8), it indicates that a signal of the navigation satellite exists in the received signals; if $i_r \geq 1$ and the correlation peak exists, the navigation message is demodulated from the carrier-removed signals of the baseband satellite navigation signals received by the branch according to the position of the correlation peak, and S21 is performed; otherwise, S17 is performed.

In S21, $i_r=i_r+1$; if $i_r \leq 16 \times i_r$, S17 is performed; otherwise, S22 is performed.

In S22, the grouped navigation messages obtained from the parallel signal transmission branches of 16 sub-channels are changed from parallel transmission to serial transmission, and a complete navigation message of one navigation satellite is obtained through the channel.

In S23, the visual navigation messages of Beidou navigation satellites are obtained through 16 channels respectively according to blocks S16-S22, and positioning solution is performed for navigation messages of four BeiDou satellites selected by using a microprocessor containing four cores to realize rapid navigation positioning.

In S24, the process is ended.

As shown in FIG. 9, a system for realizing real-time transmission and demodulation technology of a BeiDou satellite navigation signal comprises:

a parallel signal transmission branch constructing module, configured to satisfy a requirement that satellite navigation messages are grouped to perform quasi-real-time or real-time transmission;

a navigation message grouping serial-to-parallel module, configured to group the satellite navigation messages in a set length unit or regroup fragmented satellite navigation messages after recombination so that the transmission is changed from serial transmission to parallel transmission so as to improve transmission efficiency of the navigation messages;

a non-linear function driven complex shift pseudo-random code generator constructing module, configured to perform a hybrid operation with one type of single-state variable or multi-state variable or a function containing different parameters by taking a nonlinear strength as weight and form a real part by designing one group of non-linear functions with different diffusion coefficients as weights, and then perform a hybrid operation with another type of single-state variable or multi-state variable or a function containing different parameters by taking a nonlinear strength as weight and form an imaginary part by designing another group of non-linear functions with different diffusion coefficients as weights, drive interactions of the non-linear functions by using an action value obtained by performing a hybrid operation with a correlation register tap value, and take the action value obtained by performing the hybrid operation according to the action value of the non-linear function as a feedback end to construct a non-linear function driven complex shift pseudo-random code generator or constructing the linear shift pseudo-code generator with at least two linear shift registers;

a sub-ranging code generating module, configured to: output a pseudo-random number by using one part of tap combinations of the real part and the imaginary part of correlation register state value of the non-linear function driven complex shift pseudo-random code generator to obtain a navigation satellite ranging code by the sorting method, binarization and modulo-2 sum; output a pseudo-random number by using another part of tap combinations of the real part and the imaginary part of the correlation register state value to obtain a navigation satellite public sub-ranging code by the sorting method, binarization and modulo-2 sum; and finally obtain a navigation satellite-dedicated sub-ranging code by performing modulo-2 sum for the navigation satellite public sub-ranging code and the navigation satellite ranging code respectively;

a spectrum-spreading module, configured to perform spectrum spreading for the grouped navigation messages in the parallel signal transmission branch or within the given time slot respectively by using the navigation satellite dedicated sub-ranging code;

a carrier modulating module, configured to modulate spread spectrum signals in the parallel signal transmission branches by using carriers or complex carriers with different frequency offsets or sub-carriers or complex sub-carriers with different orthogonal phases respectively;

a signal superimposing module, configured to superimpose or combine spread spectrum signals or carrier modulated signals of all or partial parallel signal transmission branches or together with spread spectrum signals or carrier modulated signals of other parallel signal transmission branches;

a navigation signal generating module, configured to generate a baseband satellite navigation signal by adding Gaussian white noise or another noise to the superimposed or combined signal;

a tracking and capturing module, configured to perform carrier-removal, de-spreading and demodulation for the navigation signals of different parallel signal transmission branches of a navigation satellite transmitter respectively;

a navigation message parallel-to-serial changing module, configured to change the grouped navigation messages obtained by performing carrier-removal, de-spreading and demodulation for different parallel signal transmission branches from parallel transmission or unpacked grouped navigation messages to serial transmission to obtain complete navigation message of the satellite; and a positioning solution module, configured to realize rapid navigation positioning according to the obtained satellite navigation message.

It will be obvious to those skilled in the art that changes and modifications may be made, and therefore, the aim in the appended claims is to cover all such changes and modifications.

What is claimed is:

1. A method, comprising:
S1: constructing small and medium-scale or large-scale or ultra-large-scale parallel signal transmission branches in a navigation satellite transmitter baseband chip field-programmable gate array (FPGA) to satisfy quasi-real-time or real-time transmission of subsequently grouped satellite navigation message, wherein the number of small and medium-scale parallel signal transmission branches is smaller than 100, the number of large-scale parallel signal transmission branches is not smaller than 100, and the number of ultra-large-scale parallel signal transmission branches is not smaller than 1000;

S2: generating satellite navigation messages according to a given structure or constructing the satellite navigation messages with same or different navigation information combinations as a data block with a given length through injection of a ground injection station or in a navigation satellite transmitter digital signal processor (DSP) chip, and grouping the satellite navigation messages in a set length unit or regrouping fragmented satellite navigation messages or packing the grouped messages based on a group sequence number, time to live and message length, to form the grouped messages into a matrix, wherein performing grouping based on the satellite navigation message structure comprises performing grouping based on a super-frame or a main frame or a sub-frame or a word or a data block, or a bit number with a set length;

S3: sequentially sending the grouped or group-coded satellite navigation messages in rows or columns or based on a given time slot, into the parallel signal transmission branches respectively;

S4: performing a hybrid operation with single state variables or multi-state variables or a function containing different parameters by taking a non-linear strength as a weight, and forming a real part by designing one group of non-linear functions with different diffusion coefficients as weights; performing a hybrid operation with another type of single state variable or multi-state variables or a function containing different parameters by taking a non-linear strength as a weight, and forming an imaginary part by designing another group of non-linear functions with different diffusion coefficients as weights; driving the interactions of the non-linear functions based on an action value obtained by performing a hybrid operation with tap values of the correlation register, and constructing a non-linear function driven complex shift pseudo-random code generator with an action value obtained by performing the hybrid operation with the non-linear function action values as a feedback end or constructing the linear shift pseudo-code generator with at least two linear shift registers, wherein the real part and the imaginary part of the correlation register state value of the non-linear function driven complex shift pseudo-random code generator form a real part sub-pseudo random code generator and an imaginary part sub-pseudo random code generator respectively;

S5: performing parameter setting for a series and a generated code length of the non-linear function driven complex shift pseudo-random code generator;

S6: initializing the state value of the non-linear function driven complex shift pseudo-random code generator with same or different complex data;

S7: outputting a pseudo-random number through one part of tap combinations of the real part and the imaginary part of the correlation register state value of the non-linear function driven complex shift pseudo-random code generator, obtaining a navigation satellite ranging code by a sorting method, binarization, and modulo-2 sum, and taking the code as the first or non-first parallel signal transmission branch-dedicated sub-ranging code, wherein the branch signal is used to detect existence of the navigation satellite navigation signal in an intercepted baseband satellite navigation signals;

S8: outputting a pseudo-random number through another part of tap combinations of the real part and the imaginary part of the correlation register state value of the non-linear function driven complex shift pseudo-random code generator, and obtaining public sub-ranging codes of all navigation satellite parallel signal transmission branches, which are referred to as navigation satellite public sub-ranging codes, by the sorting method, the binarization and the modulo-2 sum, wherein a sum of the number of all navigation satellite ranging codes and the number of all navigation satellite public sub-ranging codes is not greater than the total number of tap combinations of the real parts and the imaginary parts of all correlation registers state values of the non-linear function driven complex shift pseudo-random code generator, and the navigation satellite public sub-ranging codes are mutually correlated or uncorrelated or orthogonal or non-orthogonal or orthogonal in one part and non-orthogonal in another part;

S9: obtaining remaining parallel signal transmission branch-dedicated sub-ranging codes of the navigation satellite which are referred to as navigation satellite-dedicated sub-ranging codes, by performing modulo-2 sum for the navigation satellite ranging codes and the navigation satellite public sub-ranging codes respectively, wherein these navigation satellite-dedicated sub-ranging codes have good cross correlation, and are stored in a file or a data buffer zone to satisfy a requirement of performing real-time spectrum spreading for the navigation message of each parallel signal transmission branch, and the navigation satellite ranging codes, navigation satellite public sub-ranging codes or the navigation satellite dedicated sub-ranging codes are synchronously driven by a same clock frequency-divided from a high precision and high stability atomic clock;

S10: generating navigation satellite-dedicated sub-ranging codes in real time or obtaining navigation satellite-dedicated sub-ranging codes through the file or the data buffer zone and performing spectrum spreading for the grouped navigation messages in the parallel signal transmission branch respectively, or performing spectrum spreading for the grouped navigation messages with different navigation satellite dedicate sub-ranging codes so as to form single-channel signals after superimposition and allow the signals to be transmitted in the same parallel signal transmission branch, wherein the navigation satellite-dedicated sub-ranging codes are obtained in one of the manners;

S11: modulating spread spectrum signals in the parallel signal transmission branches respectively by using same carriers or complex carriers with different frequency offsets or sub-carriers or complex sub-carriers with different orthogonal phases and different frequency offsets respectively, wherein one of the carriers is taken for modulation;

S12: performing power equalization by adjusting gain factors of navigation satellite-dedicated sub-ranging codes of different branches to reasonably allocate signal powers of different branches, and superimposing or combining carrier-modulated signals of all parallel signal transmission branches or with carrier signals of satellite navigation signals of other branches into single-channel signals, wherein less interference occurs between these carrier signals because the navigation satellite-dedicated sub-ranging codes of different parallel signal transmission branches are uncorrelated with each other;

S13: forming a baseband satellite navigation signal by adding Gaussian white noise or another noise to the superimposed or combined single-channel signal;

S14: transmitting the baseband satellite navigation signal by a single antenna in the form of multi-channel parallel superimposition after radiofrequency modulation and power amplification;

S15: receiving, by a user receiver, the baseband satellite navigation signal obtained by low-noise amplifier and radiofrequency transformation, through single-antenna single-channel or each sub-channel contained in the single-antenna single-channel or single-antenna multi-channel or each sub-channel contained in the single-antenna multi-channel, where a channel implementation manner is $m_r \times n_r$, wherein $m_r$ refers to the number of channels, $n_r$ refers to the number of sub-channels contained in each channel respectively, and each sub-channel sequentially performs real-time demodulation for the navigation signal of the parallel signal transmission branch in a sequence number range given by a satellite transmitter respectively, or multi-antenna single-channel or each sub-channel contained in the multi-antenna single-channel or multi-antenna multi-channel or each sub-channel contained in the multi-antenna multi-channel, wherein the single-antenna single-channel or each sub-channel contained in the single-antenna single-channel refers to that each antenna is only connected to one signal processing channel, and the channel or each sub-channel contained in the channel is in charge of receiving all satellite navigation signals; the single-antenna multi-channel or each sub-channel contained in the single-antenna multi-channel refers to that each antenna is connected to not less than two signal processing channels, and each channel or each sub-channel contained in the channel is in charge of receiving corresponding satellite navigation signals; the multi-antenna single-channel or each sub-channel contained in the multi-antenna single-channel refers to that each antenna is connected to one signal processing channel respectively; the multi-antenna multi-channel or each sub-channel contained in the multi-antenna multi-channel refers to that each antenna is connected to not less than two signal processing channels respectively, and each channel or each sub-channel contained in the channel is in charge of receiving the corresponding satellite navigation signals, the channel and the sub-channels contained in the channel are implemented in the user receiver baseband chip; the number of the signal processing channels or different sub-channels contained in the channel is sufficient to ensure the real-time demodulation of the received satellite navigation signals; since each channel demodulates the navigation signals of not less than one navigation satellite respectively in the same manner, a process of performing real time demodulation for the navigation signals of one navigation satellite with $n_r$ sub-channels of one channel will be described below;

S16: selecting a sub-channel number $i_r$ as ($1 \le i_r \le n_r$) and a sequence number $i_t$ of a parallel signal transmission branch of the satellite transmitter corresponding to the sub-channel being equal to a starting sequence number of the parallel signal transmission branch of the transmitter corresponding to the sub-channel of the channel;

S17: intercepting or intercepting, in a given time slot, a segment of the baseband satellite navigation signal;

S18: generating a local carrier or a complex carrier;

S19: obtaining a carrier-removed signal by performing carrier removal for the navigation signal obtained in S17 by a Doppler frequency shift carrier matching method;

S20: generating a navigation satellite-dedicated sub-ranging code of the parallel signal transmission branch in real time or obtaining the navigation satellite-dedicated sub-ranging code of the parallel signal transmission branch through the file or the data buffer zone, and firstly eliminating cross interface of the dedicated sub-ranging codes by using a multi-user detection technology, and then binarizing the carrier-removed signal by the sorting method to perform relevant processing by an FFT-based cyclic correlation method; wherein, when $i_r = 1$ and a correlation peak exists, it indicates that the navigation satellite signal exists in the received signals, the navigation message is demodulated with the carrier-removed signal of the baseband satellite navigation signals received from the branch according to the position of correlation peak; when $i_r > 1$ and the correlation peak exists, the navigation message is demodulated from the carrier-removed signal of the baseband satellite navigation signals received by the branch according to the position of the correlation peak, and S21 is performed; otherwise, S17 is performed;

S21: $i_t = i_t + 1$, when $i_t$ is smaller than or equal to a cut-off sequence number of the parallel signal transmission branch of the satellite transmitter corresponding to the sub-channel of the channel, performing S17; otherwise, performing S22;

S22: changing the grouped navigation messages or unpacked grouped navigation messages obtained from the parallel signal transmission branches of different sub-channels from parallel transmission to serial transmission and obtaining complete navigation messages of one navigation satellite through the channel;

S23: obtaining visual navigation messages of navigation satellites through different channels respectively according to blocks S15-S22, and performing positioning solution for the navigation messages of four selected navigation satellites by using a microprocessor containing no less than one core to realize rapid navigation positioning; and S24: ending the process.

2. The method of claim 1, wherein in S4, the single-state variable or the multi-state variable or the function containing different parameters at the feedback end of the non-linear function driven complex shift pseudo-random code generator is repeatedly used in the construction of the non-linear functions, and the constructed non-linear functions are repeatedly used in different non-linear function action formulas, and different non-linear functions work at a same frequency or different frequencies.

3. The method of claim 2, wherein in S10, different parallel signal transmission branches transmits same or different types of non-multiplexed or multiplexed satellite pilot signals or satellite navigation signals or satellite communication signals at the same time.

4. The method of claim 1, wherein in S7, the pseudo-random number tap-output by the real part and the imaginary part of the register state value is binarized; since the processing of changing the pseudo-random number is changed into the pseudo-random code by a statistic analysis method is simple, when the tap-output pseudo-random code sequence is different from other tap-output pseudo-random code sequences in one part of values, and the other part of values are same or all values are same, processing is performed in the following manner: performing inversion for all values of the pseudo-random code sequence; or performing cyclic shifting for the pseudo-random code sequence with a set code length; or mixing the pseudo-random code sequence with another pseudo-random code sequence; or deleting one of the pseudo-random code sequences.

5. The method of claim 4, wherein in S10, different parallel signal transmission branches transmits same or different types of non-multiplexed or multiplexed satellite pilot signals or satellite navigation signals or satellite communication signals at the same time.

6. The method of claim 1, wherein in S8, the navigation satellite public sub-ranging codes are generated by combining another part of taps of the variables or the functions or the register state values of different sub-pseudo-random code generators of the pseudo-random code generator that generates navigation satellite ranging codes and is formed by different sub-pseudo-random code generators, or by combining joint taps of the variables or the functions or the register state values of another pseudo-random code generator, or by combining individual taps of the variables or the functions or the register state values of different sub-pseudo-random code generators of another pseudo-random code generator formed by different sub-pseudo-random code generators; or real numbers output by these taps are modulated by real number offset carriers respectively and pseudo-randomness of subsequently generated pseudo-random codes maintained by adjusting relevant parameters of the non-linear functions constructing the pseudo-random code generator, or under a condition that the taps of the variables or the functions or given state values of the register structure of the pseudo-random code generator are unchanged, different navigation satellite ranging codes or navigation satellite public sub-ranging codes or navigation satellite-dedicated sub-ranging codes with different navigation frequency points satisfying different navigation service requirements are generated in a unified manner by changing initial values or changing the relevant parameters of the non-linear functions constructing the pseudo-random code generator or re-designing the non-linear functions constructing the pseudo-random code generator, wherein one part of tap combinations of all tap combinations of the variables or functions or register state values of different sub-pseudo-random code generators of the pseudo-random code generator are used to perform phase allocation for the navigation satellite ranging codes, another part of tap combinations are used to perform phase allocation for the navigation satellite public sub-ranging codes or navigation satellite-dedicated sub-ranging codes, and the remaining tap combinations are used as backup for future extensions.

7. The method of claim 6, wherein in S10, different parallel signal transmission branches transmits same or different types of non-multiplexed or multiplexed satellite pilot signals or satellite navigation signals or satellite communication signals at the same time.

8. The method of claim 1, wherein in S9, the navigation satellite ranging code is individually used as the dedicated sub-ranging code of one parallel signal transmission branch, or used as the dedicated sub-ranging code of one parallel signal transmission branch after being subjected to modulo-2 sum or mixed with the public sub-ranging codes of one navigation satellite; or the navigation satellite-dedicated sub-ranging codes are modulated by a binary offset carrier respectively and the pseudo-randomness of the dedicated sub-ranging code is maintained by adjusting relevant parameters of the non-linear functions constructing the pseudo-random code generator.

9. The method of claim 8, wherein in S10, different parallel signal transmission branches transmits same or different types of non-multiplexed or multiplexed satellite pilot signals or satellite navigation signals or satellite communication signals at the same time.

10. The method of claim 1, wherein in S10, different parallel signal transmission branches transmits same or different types of non-multiplexed or multiplexed satellite pilot signals or satellite navigation signals or satellite communication signals at the same time.

11. The method of claim 1, wherein in S11, a Doppler frequency shift is in a range of (−10 kHz, 10 kHz).

12. The method of claim 1, wherein in S13, a signal-to-noise ratio of the satellite navigation signal is in a range of (−15 dB, 0 dB).

13. The method of claim 1, wherein in S14, the carrier signals of the parallel signal transmission branch are divided into different parts or superimposed or combined with carrier signals of satellite navigation signals of other branches for multi-antenna transmission performed through at least two antennas after radiofrequency modulation and power amplification, or spread spectrum signals of parallel signal transmission branches are superimposed or combined with partial or all spread spectrum signals of satellite navigation signals of other branches and modulated by same carriers or sub-carriers with different orthogonal phases for multi-antenna transmission performed through the single antenna or at least two antennas after radiofrequency modulation and power amplification.

14. The method of claim 1, wherein in S15, the non-multiplexed or multiplexed satellite pilot signal or the satellite navigation signal or the satellite communication signal or a satellite control signal is received or sent between the navigation satellite and a ground receiver or between the navigation satellite and a ground station or between the navigation satellites or between a ground based augmentation system and both the navigation satellite and the ground receiver through the single-antenna single-channel or each sub-channel contained in the single-antenna single-channel or the single-antenna multi-channel or each sub-channel contained in the single-antenna multi-channel or the multi-antenna single-channel or each sub-channel contained in the multi-antenna single-channel or the multi-antenna multi-channel or each sub-channel contained in the multi-antenna multi-channel, wherein each channel containing sub-channels contains same or different numbers of sub-channels respectively; the above single channel or multi-channel processes not only relevant transmitter parallel signals received but also serial signals; if baseband signals generated by the channel are transmitted, the processed baseband signals are transmitted through a corresponding antenna after radiofrequency modulation and power amplification; if signals are received through an antenna, the signals are sent into relevant channel through low-noise amplifier and radiofrequency transformation.

15. A system, comprising:
a parallel signal transmission branch constructing module, configured to satisfy a requirement that satellite navigation messages are grouped to perform quasi-real-time or real-time transmission;
a navigation message grouping serial-to-parallel module, configured to group the satellite navigation messages in a set length unit or regroup fragmented satellite navigation messages after recombination so that the transmission is changed from serial transmission to parallel transmission so as to improve transmission efficiency of the navigation messages;

a non-linear function driven complex shift pseudo-random code generator constructing module, configured to perform a hybrid operation with one type of single-state variable or multi-state variable or a function containing different parameters by taking a nonlinear strength as weight and form a real part by designing one group of non-linear functions with different diffusion coefficients as weights, and then perform a hybrid operation with another type of single-state variable or multi-state variable or a function containing different parameters by taking a nonlinear strength as weight and form an imaginary part by designing another group of non-linear functions with different diffusion coefficients as weights, drive interactions of the non-linear functions by using an action value obtained by performing a hybrid operation with a correlation register tap value, and take the action value obtained by performing the hybrid operation according to the action value of the non-linear function as a feedback end to construct a non-linear function driven complex shift pseudo-random code generator or constructing the linear shift pseudo-code generator with at least two linear shift registers;

a sub-ranging code generating module, configured to: output a pseudo-random number by using one part of tap combinations of the real part and the imaginary part of correlation register state value of the non-linear function driven complex shift pseudo-random code generator to obtain a navigation satellite ranging code by the sorting method, binarization and modulo-2 sum; output a pseudo-random number by using another part of tap combinations of the real part and the imaginary part of the correlation register state value to obtain a navigation satellite public sub-ranging code by the sorting method, binarization and modulo-2 sum; and finally obtain a navigation satellite-dedicated sub-ranging code by performing modulo-2 sum for the navigation satellite public sub-ranging code and the navigation satellite ranging code respectively;

a spectrum-spreading module, configured to perform spectrum spreading for the grouped navigation messages in the parallel signal transmission branch or within the given time slot respectively by using the navigation satellite dedicated sub-ranging code;

a carrier modulating module, configured to modulate spread spectrum signals in the parallel signal transmission branches by using carriers or complex carriers with different frequency offsets or sub-carriers or complex sub-carriers with different orthogonal phases respectively;

a signal superimposing module, configured to superimpose or combine spread spectrum signals or carrier modulated signals of all or partial parallel signal transmission branches or together with spread spectrum signals or carrier modulated signals of other parallel signal transmission branches;

a navigation signal generating module, configured to generate a baseband satellite navigation signal by adding Gaussian white noise or another noise to the superimposed or combined signal;

a tracking and capturing module, configured to perform carrier-removal, de-spreading and demodulation for the navigation signals of different parallel signal transmission branches of a navigation satellite transmitter respectively;

a navigation message parallel-to-serial changing module, configured to change the grouped navigation messages obtained by performing carrier-removal, de-spreading and demodulation for different parallel signal transmission branches from parallel transmission or unpacked grouped navigation messages to serial transmission to obtain complete navigation message of the satellite; and a positioning solution module, configured to realize rapid navigation positioning according to the obtained satellite navigation message.

16. The system of claim 15, wherein the tracking and capturing module is operated as follows:
1) receiving, by a user receiver, the baseband satellite navigation signal through single-antenna multi-channel or each sub-channel contained in the single-antenna multi-channel;
2) taking a sub-channel number $i_r$ as $(1 \leq i_r \leq n_r)$ and a sequence number $i_t$ of a parallel signal transmission branch of the satellite transmitter corresponding to the sub-channel being equal to a starting sequence number of the parallel signal transmission branch of the satellite transmitter corresponding to the sub-channel of the channel;
3) intercepting, or intercepting in a given time slot, a segment of the baseband satellite navigation signal;
4) generating a local carrier or a complex carrier;
5) obtaining a carrier-removed signal by performing carrier removal for the navigation signal obtained in 3) by the Doppler frequency shift carrier matching method;
6) generating a parallel signal transmission branch navigation satellite-dedicated sub-ranging code in real time or obtaining the parallel signal transmission branch navigation satellite dedicated sub-ranging code through a file or a data buffer zone, firstly eliminating cross interface of the dedicated sub-ranging codes by using a multi-user detection technology, and then binarizing the carrier-removed signal by the sorting method to perform relevant processing by an FFT-based cyclic correlation method; wherein when $i_r=1$ and a correlation peak exists, it indicates that the navigation satellite signal exists in the received signals, the navigation message is demodulated with the carrier-removed signal of the baseband satellite navigation signals received from the branch according to the position of correlation peak; when $i_r>1$ and the correlation peak exists, the navigation message is demodulated from the carrier-removed signal of the baseband satellite navigation signals received by the branch according to the position of the correlation peak, and 7) is performed; otherwise, 3) is performed;
7) $i_t=i_t+1$, when $i_t$ is smaller than or equal to a cut-off sequence number of the parallel signal transmission branch of the satellite transmitter corresponding to the sub-channel of the channel, performing 3); otherwise, performing 8); and
8) changing the grouped navigation messages obtained from parallel signal transmission branches of each sub-channel or unpacked grouped navigation messages from parallel transmission to serial transmission and obtaining a complete navigation message of one navigation satellite through the channel.

\* \* \* \* \*